United States Patent [19]
Poyser

[11] Patent Number: 4,638,896
[45] Date of Patent: Jan. 27, 1987

[54] SHOCK ABSORBERS

[75] Inventor: John Poyser, Haxby, England

[73] Assignee: Armstrong Patents Co. Ltd., North Humberside, United Kingdom

[21] Appl. No.: 730,059

[22] Filed: May 3, 1985

[30] Foreign Application Priority Data

May 3, 1984 [GB] United Kingdom ............... 8411319

[51] Int. Cl.[4] .................. B62K 25/06; F16F 9/46
[52] U.S. Cl. .................... 188/299; 188/315; 188/317; 188/322.14; 188/322.15; 251/129.16
[58] Field of Search ............... 188/299, 319, 282, 281, 188/313–318, 322.14, 322.15, 322.13, 277, 278, 280, 284–285, 161–16, 322.19; 280/707, 714; 251/129.16, 129.22, 129.15, 353, 349; 267/64.15–64.26

[56] References Cited

U.S. PATENT DOCUMENTS

| | | | |
|---|---|---|---|
| 2,780,321 | 2/1957 | Sturari | 188/319 |
| 2,996,155 | 8/1961 | Priesemuth | 188/281 |
| 3,161,033 | 12/1964 | Iketani | 251/349 X |
| 3,422,850 | 1/1969 | Caldwell | 251/129.16 X |
| 3,559,776 | 2/1971 | Schultze | 188/299 |
| 3,741,582 | 6/1973 | Eckert | 280/714 |
| 4,313,529 | 2/1982 | Kato et al. | 188/299 |
| 4,333,668 | 6/1982 | Hendrickson et al. | 280/707 X |
| 4,401,196 | 8/1983 | Grundei | 188/282 |
| 4,463,839 | 8/1984 | Ashiba | 188/299 |
| 4,468,739 | 8/1984 | Woods et al. | 280/714 X |
| 4,506,751 | 3/1985 | Stephens | 280/707 X |
| 4,527,676 | 7/1985 | Emura et al. | 188/299 |

FOREIGN PATENT DOCUMENTS

| | | | |
|---|---|---|---|
| 2655811 | 6/1978 | Fed. Rep. of Germany | 188/322.14 |
| 2911768 | 10/1980 | Fed. Rep. of Germany | 188/299 |
| 0173632 | 10/1982 | Japan | 188/322.15 |
| 57-534 | 4/1983 | Japan | 188/299 |
| 0085707 | 5/1983 | Japan | 188/299 |
| 0221031 | 12/1983 | Japan | 188/299 |
| 0736431 | 9/1955 | United Kingdom | 188/299 |

Primary Examiner—Douglas C. Butler
Attorney, Agent, or Firm—John S. Hale

[57] ABSTRACT

The present invention provides a shock absorber of monotube or twin-tube configuration wherein the piston within the shock absorber includes an electromagnetically operable bypass valve, the electromagnetically operable valve being controlled remotely from the outside of the shock absorber via an electrical connection which extends along the piston rod. In a twin tube configuration according to the present invention, the foot valve assembly also includes an electromagnetically operable bypass valve which is remotely controlled from the outside of the shock absorber via an electrical connection. These electrical connections do not affect the overall design of the shock absorber and can thus be easily included in a vehicle design. Further, these electrical connections can be connected to a microprocessor so that the shock absorber valves are controlled by the microprocessor dependent upon the values of certain parameters, e.g. speed, load, fed to the microprocessor from appropriate sensors.

3 Claims, 3 Drawing Figures

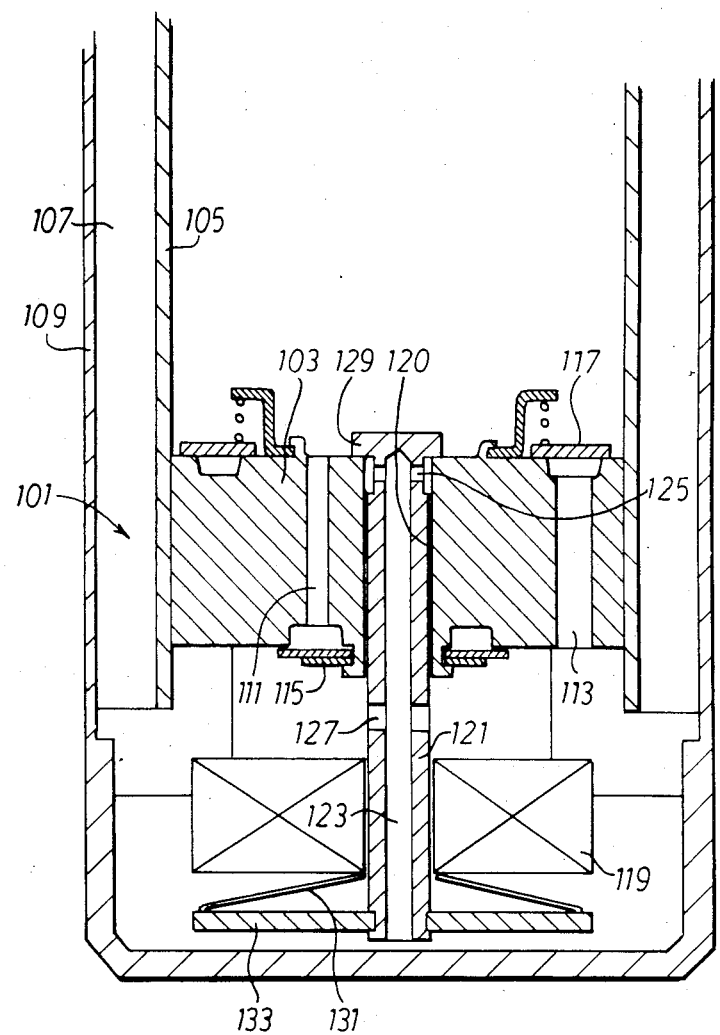
Fig_3.

SHOCK ABSORBERS

The present invention relates to shock absorbers for use in automotive vehicles.

More particularly the present invention relates to telescopic shock absorbers. All such telescopic shock absorbers comprise a piston which is axially movable in a cylinder, the piston incorporating valves for restricting the flow of fluid therethrough as the piston moves along the cylinder. The valves are so designed to provide a greater resistance in one direction of piston movement than the other. However, these valves are usually preset during manufacture and the setting of these valves is not suitable for all vehicle load conditions, surfaces over which the vehicle may be driven, and/or speeds.

To cater to a certain extent, for varying loads, road surfaces etc, shock absorbers have been produced with adjustable piston valves and/or with additional controlled valves. However such valves have been adjustable externally of the shock absorber, either manually or electro-mechanically. Thus, manual or electro-mechanical controls have had to be provided on the outside of the shock absorber, thereby increasing the overall size of the shock absorber. This is clearly disadvantageous as space-saving is an important consideration in vehicle suspension design.

An aim of the present invention is to provide a shock absorber which allows for the remote adjustment of the piston valves without increasing the overall outer configuration of the shock absorber.

According to the present invention there is provided a telescopic shock absorber comprising a piston which is axially slidable within a cylinder, an electromagnetically controlled valve being arranged to provide a fluid flow path bypassing the piston when desired.

Thus, the electromagnetically controlled valve may have a wire connection through the piston and a piston rod connected to the piston, to the outside where the wire can extend to a remote location from which the valve can be controlled. This wire connection adds virtually nothing to the size of the shock absorber and thus does not affect the suspension design. Further it is possible to efficiently seal the shock absorber around the wire, whereas it is difficult to provide adequate sealing around a movable mechanical linkage.

Electromagnetically operated valves may be incorporated in the pistons of monotube or twin-tube shock absorbers and preferably are in addition to the existing piston valves. The electromagnetic valve thus provides an additional flow path in parallel with the conventional flow path through the piston. The effect of this additional flow path is to provide for a change in the setting characteristic by increasing or decreasing the pressure drop across the piston. The normal setting for the de-energised electromagnetic valve is for the valve to be closed. When energized the increased total flow through the piston results in a lower resistance to piston movement at a given piston velocity.

In twin-tube telescopic shock absorbers which basically comprise two elongate hollow cylinders, the cylinders being coaxially arranged with respect to each other, one within the other, a foot valve is provided at one end of the inner cylinder, a piston being axially movable within the inner cylinder and being connected with a piston rod which extends out of the other end of the inner cylinder. The foot valve controls the flow of fluid between the inner cylinders and the annular cavity formed between the cylinders, which acts as a fluid reservoir. Conventionally two valves are provided in the foot valve assembly, each valve allowing for fluid flow in a different direction and restricting fluid flow to a different extent. These valves are preset during design and manufacture of the shock absorber, but clearly they cannot provide the required performance for all types of terrain and/or load.

It is an aim of the present invention to provide a shock absorber additionally having an adjustable foot valve, to thus cater for different performance requirements.

According to the present invention there is provided a telescopic shock absorber comprising a piston which is axially slidable within a cylinder, an electromagnetically controlled valve being arranged to provide a fluid flow path bypassing the piston when desired.

According to a further feature of the present invention there is provided a twin tube telescopic shock absorber comprising a pair of coaxially aligned cylinders, one cylinder being located within the other, a foot valve assembly being located at one end region of the inner cylinder to control fluid flow between the inner cylinder and the annular cavity between the cylinders, and a piston being axially slidably arranged within said inner cylinder, an electromagnetically controlled valve being arranged to provide a fluid path bypassing the piston when desired, and the foot valve assembly also incorporating an electromagnetically operable valve, said valves being controllable from a remote location outside the shock absorber.

Preferably, the electromagnetically operated valve in the foot valve assembly provides an additional flow path in parallel to the opposite direction flow paths provided by the usual two valves. With the valve de-energised the valve is closed allowing the foot valve to operate conventionally. However, when energised the additional flow path is open in both flow directions, thereby reducing the resistance to flow.

In a preferred embodiment, the electromagnetic valve in the foot valve assembly comprises an electromagnet which is connected by an electrical wire to a remote control outside the shock absorber. The electromagnet acts on an elongate hollow tube which passes through the foot valve assembly and is axially movable relative thereto. In the normal position with the electromagnet de-energised, the hollow tube is retracted to close off lateral ports in the tube. However, when energised, the electromagnet moves the hollow tube to expose the lateral ports and to thus provide a flow path through the foot valve assembly in addition to that provided by the conventional valves.

The above described electromagnetic foot and piston valves provide the required adjustment to cater for the desired performance having regard to speed, load and terrain. Further the or each electromagnetic valve may be controlled automatically dependent, for example, upon speed, load etc as monitored by appropriate sensors.

The present invention will now be further described, by way of example, with reference to the accompanying drawings, in which:

FIG. 3 is a cross-sectional view of part of one embodiment of a twin-tube telescopic shock absorber, incorporating an electromagnetically operable foot valve according to the present invention.

Figure 1:
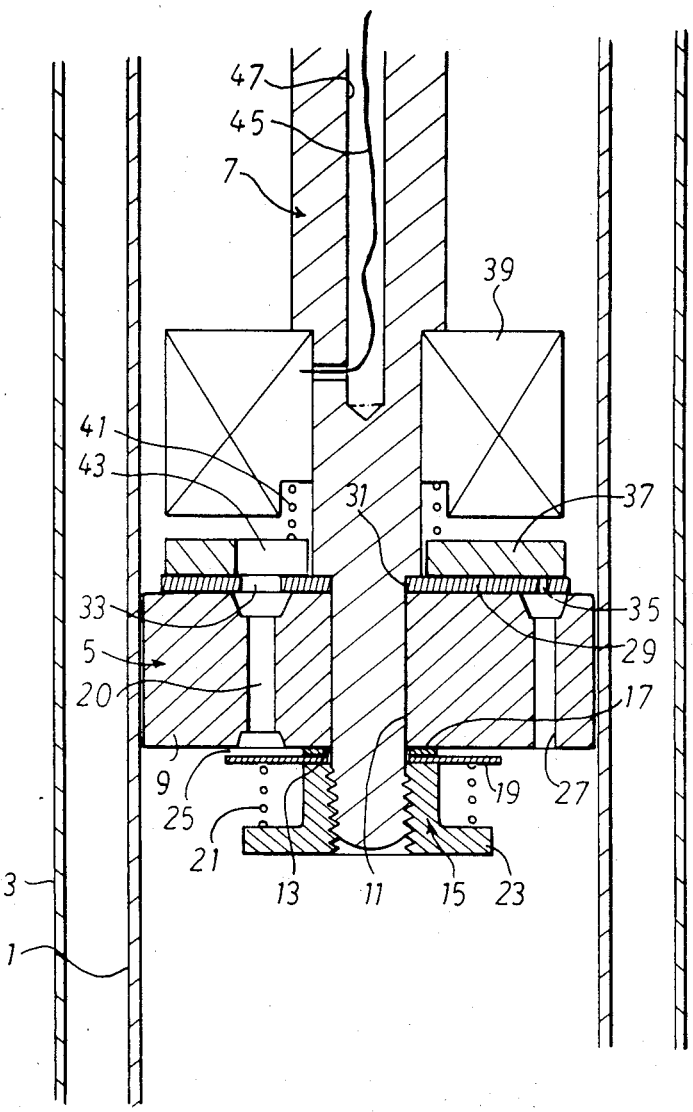
FIG. 1 is a cross-sectional view of part of one embodiment of a twin-tube telescopic shock absorber, incorporating an electromagnetically operable piston valve according to the present invention.

FIG. 1 illustrates part of a twin-tube shock absorber comprising an inner cylinder 1 and an outer cylinder 3, said tubes 1,3 being coaxially aligned with each other.

Within the inner cylinder 1 is located a piston assembly 5 mounted on a piston rod generally designated 7. The piston assembly 5 comprises a cylindrical piston 9 which has a central bore 11 which engages snugly over a reduced diameter end region 13 of the piston rod 7. An end cap 15 screw threadedly engages the end region 13 of piston rod 7 to hold the piston 9 on piston rod 7. Trapped between the end cap 15 and piston 9 are an annular spacer 17 and a valve closure member 19, the valve closure member 19 controlling fluid flow through bore 20 and being biassed to the illustrated closed position by a spring 21 which also engages an outwardly extending flange 23 on end cap 15. As seen in FIG. 1, the closed position for closure member 19 still provides a bleed gap 25 due to spacer 17. A further bore or bores 27 also extends axially through piston 9 and an annular closure member 29 is located directly over further bore 27 and trapped between piston 9 and a shoulder 31 on the piston rod 7. This annular closure member 29 has an aperture 33 which is aligned with bore 20 and a small bore 35 aligned with further bore 27. A further annular closure plate 37 is located on piston rod 7 so as to be axially movable therealong when an electromagnet 39 also located on piston rod 7, is energised; a spring 41 biassing the further annular closure plate 37 against closure member 29. This further annular closure plate 37 is cutaway at 43 to expose aperture 33 and bore 20, but closes off small bore 35 when biassed against annular closure member 29.

Control and power for the electromagnet 39 is provided via electric cable wire 45, wire 45 extending through an axial bore 47 in piston rod 7 to the outside of the shock aborber. The exit of the wire 45 from the shock absorber can be simply sealed reliably and the wire fed to any desired remote location; the exit of the wire from the shock absorber not increasing the size of the shock absorber and thus not affecting suspension design.

With the electromagnet de-energised, closure plate 37 is held by spring 41 against closure member 29. In this condition upward movement of the piston 9 i.e. outward movement of piston rod 7, will cause fluid to flow through cutaway 43, aperture 33 and bore 20 and to deflect closure member 19 against spring 21. This fluid flow is therefore restricted by closure member 19. Downward movement of the piston 9 causes closure member 19 to return to the illustrated position, bleed gap 25 allowing a very small leakage path for fluid back along bore 20. However during this downward movement of the piston, fluid can flow along further bore 27 and deflect both closure member 29 and closure plate 37 against spring 41, allowing restricted fluid flow.

When the electromagnet 39 is energised, the closure plate 37 is lifted off closure member 29 against spring 41, exposing small bore 35. In this condition fluid can flow through further bore 27 and small bore 35 in either direction of piston movement. In particular, the flow path is increased for upward movement of the piston, thus reducing the resistance to piston movement at a particular piston speed. Thus by energising the electromagnet 39, the performance of the shock absorber can be adjusted to suit changing speed, load etc., without the requirement for bulky external control means on the shock absorber.

Figure 2:
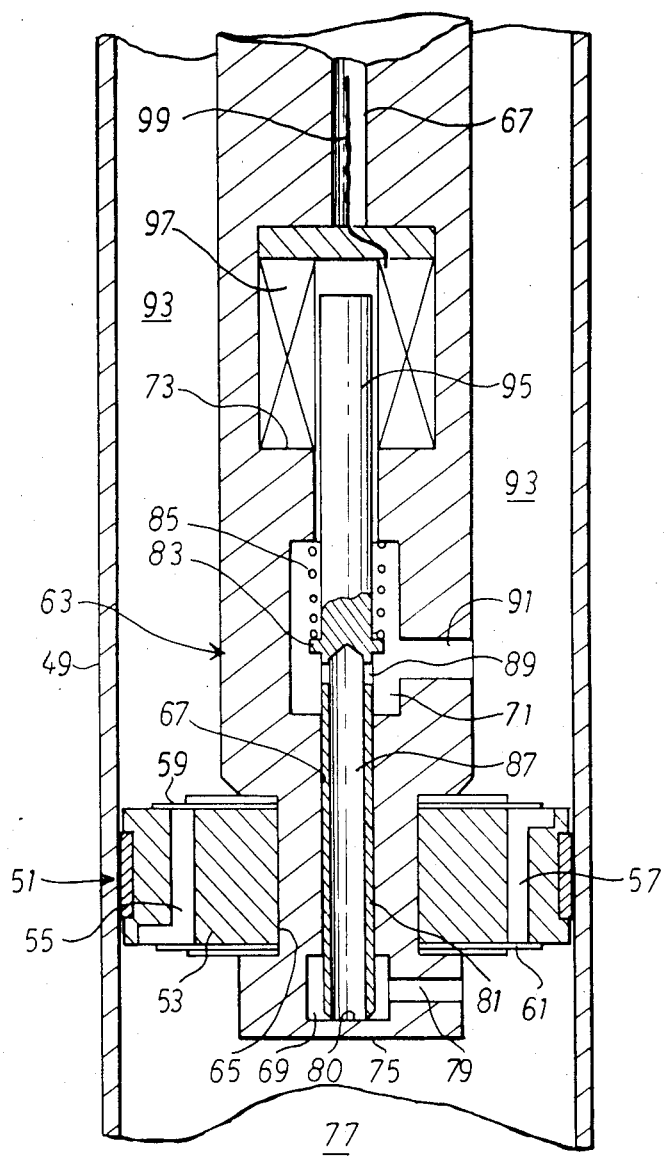
FIG. 2 is a cross-sectional view of part of one embodiment of a monotube telescopic shock absorber, incorporating an electromagnetically operable piston valve according to the present invention.

FIG. 2 shows part of a monotube shock absorber comprising a hollow cylindrical casing 49 within which a piston assembly 51 is axially slidable. The piston assembly 51 comprises a cylindrical piston 53 having two valve bores 55 and 57 extending axially therethrough. Flexible valve closure members 59 and 61 allow fluid to flow only in opposite directions through bores 55 and 57 respectively, and thus provide for conventional operation of the shock absorber.

A piston rod assembly 63 extends through a central axial bore 65 in piston 53, and is secured thereto. The piston rod assembly 63 has a central axially extending bore 67 which connects with three cavities 69, 71 and 73 in the illustrated embodiment. Cavity 69 is towards the free end 75 of the piston rod and connects with the shock absorber space 77 in front of piston 53 by a bore 79 which extends laterally of the piston rod. Cavity 69 also presents a planar valve seat 80 against which a tubular valve closure member 81 can engage. Tubular valve closure member 81 extends through bore 67 and cavities 71 and 73. In cavity 71 tubular closure member 81 has a laterally outwardly extending annular flange 83 against which a spring 85 engages to bias the valve closure member 81 against valve seat 80. Tubular valve closure member 81 has a blind bore 87 extending for part of its length, the blind bore being open at the end of the closure member 81 which engages valve seat 80 and connecting with cavity 71 via lateral ports 89. Cavity 71 connects via lateral bore 91 with the shock absorber space 93 behind piston 53.

The solid part 95 of the tubular closure member 81 extends into cavity 73 wherein an electromagnet 97 is housed, the electromagnet 97 being powered and controlled via a wire 99, the wire extending via bore 67 to outside the shock absorber and requiring no bulky control means on the outside of the shock absorber. When the electromagnet is de-energised, the spring 85 holds closure member 81 against valve seat 80, closing the additional path 91, 71, 89, 87, 69, 79 across the piston 53. However, when the electromagnet 97 is energised the tubular closure member 81 is moved axially in bore 67 lifting the tubular closure member 81 off valve seat 80 and opening said additional flow path. Thus by operation of the electromagnet the shock absorber performance can be changed. Further the small dimension of the wall thickness of the tubular closure member means that a relatively weak spring is required to both close and hold this additional path closed, against fluid pressure.

By providing restrictors (not shown) in either or both lateral bores 79 and 91, the degree of setting resistance can be preset. These restrictors may be in the form of a one way arrangement with a restricted bypass. By these means, the setting change for rebound and compression can be varied.

FIG. 3 shows part of a twin-tube shock absorber such as illustrated in FIG. 1, incorporating a foot valve generally designated 101. This foot valve 101 comprises an end plug 103 secured in the inner cylinder 105 of the shock absorber, and separating the inner cylinder space from the annular reservoir cavity 107 formed between the inner cylinder 105 and outer cylinder 109. Conventionally, end plug 103 has two concentric series of axially extending valve bores 111 and 113 which are controlled by valve closure members 115 and 117 respectively so as to allow fluid flow in opposite directions, one valve providing a greater resistance to fluid flow than the other.

Fixedly mounted in the shock absorber below the end plug 103 is an electromagnet 119 which is powered and controlled via a wire (not shown) which extends to the outside of the shock absorber, allowing for simple remote control. Extending through the centre of the electromagnet 119 and through a central bore 120 in end plug 103, is a tubular valve spool 121. The valve spool 121 has an axially extending blind bore 123 which is open beneath the electromagnet 119 and has lateral ports 125 and 127. At the closed end of the valve spool 121, a lateral flange 129 is provided, this flange 129 engaging the upper face of end plug 103 to close lateral ports 125 under the biassing action of a spring 131 which engages between a lateral extension 133 of the spool 121, and the electromagnet 119. With the valve spool 121 in this position, the shock absorber performs conventionally in respect of foot valve 101. However, if the electromagnet 119 is energised the spool 121 moves axially against spring 131, to open an additional flow path via lateral ports 125 and 127, and bore 123, across end plug 103. Thus the performance of the foot valve can be varied as required.

The above described foot valve 101 can be used in a shock absorber with the electromagnetic piston valve arrangement of the present invention, or with a conventional electromechanically adjustable or non-adjustable piston valve arrangement, as desired. The control of the foot valve can be effected manually or automatically dependent upon vehicle operating parameters e.g. load, speed etc, as monitored by appropriate sensors.

The present invention thus provides a shock absorber wherein the performance can be adjusted as desired, the shock absorber requiring no bulky major external design changes which could affect the suspension design configuration.

I claim:

1. A twin tube telescopic shock absorber comprising a pair of coaxially aligned cylinders, one cylinder being located within the other, a foot valve assembly being located at one end region of the inner cylinder to control fluid flow between the inner cylinder and the annular cavity between the cylinders, and a piston being axially slidably arranged within the inner cylinder, an electromagnetically controlled valve being arranged to provide a fluid flow path bypassing the piston, the electromagnetically controlled valve being electrically connected to the outside of the shock absorber via an electrical connection which extends through a piston rod connected to the piston, and being closed when de-energised, the electromagnetically controlled valve comprising at least one bore extending axially through the piston, a flexible closure member of planar configuration, engaging against the rear face of the piston and having a restrictor aperture which is aligned with the bore, the flexible closure member being secured to said piston rear face at a point remote from said bore, a closure plate engaging over and being spring biased against said closure member to thus close the aperture and aligned bore, an electromagnet mounted on a piston rod connected to the rear face of the piston being capable, when energised, of lifting the closure plate off the closure member, to uncover the restrictor aperture in the closure member, allowing fluid to flow through the bore as the piston is moved axially within the cylinder.

2. A telescopic shock absorber according to claim 1, wherein the foot valve assembly incorportates an electromagnetically operable valve.

3. A telescopic shock absorber according to claim 2, wherein the electromagnetically operable valve comprises an elongate valve spool which extends through a bore in an end plug which closes one end of said inner cylinder, the valve spool being spring biased towards a position in which said bore is closed, an electromagnet being arranged to, when energised, move the valve spool to provide a fluid flow path through said bore.

* * * * *